(12) United States Patent
Falzone et al.

(10) Patent No.: US 12,271,721 B2
(45) Date of Patent: Apr. 8, 2025

(54) METHOD, APPARATUS, AND COMPUTER READABLE MEDIUM FOR SENSOR-BASED APPLICATION DEPLOYMENT

(71) Applicant: ATHENA SECURITY, INC., Austin, TX (US)

(72) Inventors: Lisa Falzone, Austin, TX (US); Chris Ciabarra, Austin, TX (US)

(73) Assignee: ATHENA SECURITY, INC., Austin, TX (US)

( * ) Notice: Subject to any disclaimer, the term of this patent is extended or adjusted under 35 U.S.C. 154(b) by 489 days.

(21) Appl. No.: 17/579,099

(22) Filed: Jan. 19, 2022

(65) Prior Publication Data

US 2022/0229646 A1 Jul. 21, 2022

Related U.S. Application Data

(60) Provisional application No. 63/139,041, filed on Jan. 19, 2021.

(51) Int. Cl.

| | | |
|---|---|---|
| *G06F 9/445* | (2018.01) | |
| *G01J 5/00* | (2022.01) | |
| *G06F 8/61* | (2018.01) | |
| *G06V 10/22* | (2022.01) | |
| *G06V 40/16* | (2022.01) | |
| *H04L 67/00* | (2022.01) | |
| *H04L 67/12* | (2022.01) | |
| *H04N 23/90* | (2023.01) | |

(52) U.S. Cl.
CPC .............. *G06F 8/61* (2013.01); *G01J 5/0025* (2013.01); *G06V 10/22* (2022.01); *G06V 40/166* (2022.01); *G06V 40/168* (2022.01); *H04L 67/12* (2013.01); *H04L 67/34* (2013.01); *H04N 23/90* (2023.01); *G01J 2005/0077* (2013.01)

(58) Field of Classification Search
CPC ........................................................ G06F 8/61
USPC ........................................................ 717/178
See application file for complete search history.

(56) References Cited

U.S. PATENT DOCUMENTS

| | | | |
|---|---|---|---|
| 8,663,106 B2* | 3/2014 | Stivoric ................ | G16H 40/63 |
| | | | 600/301 |
| 9,002,864 B1 | 4/2015 | Payne | |
| 9,069,637 B2 | 6/2015 | Davidson et al. | |
| 9,568,908 B2 | 2/2017 | Lawson et al. | |
| 9,569,196 B2 | 2/2017 | Das et al. | |
| 9,798,881 B2 | 10/2017 | Davidson et al. | |
| 9,838,502 B2 | 12/2017 | Croft | |
| 9,965,562 B2 | 5/2018 | Lawson et al. | |
| 9,973,375 B2 | 5/2018 | Shatzkamer | |
| 10,027,500 B2* | 7/2018 | Ansari ................... | G06F 16/64 |
| 10,163,145 B2 | 12/2018 | Yoon et al. | |

(Continued)

*Primary Examiner* — Evral E Bodden
(74) *Attorney, Agent, or Firm* — Amardeep S. Grewal; Reed Smith LLP

(57) ABSTRACT

A method, apparatus, and computer-readable medium for sensor-based application deployment, including receiving a sensor analysis application from a remote server over a computer network, executing the sensor analysis application, including communicating with one or more hardware sensors deployed at the local deployment site over a local network and analyzing sensor data received from the one or more hardware sensors over the local network to generate result data, and transmitting the result data to the remote server over the computer network.

18 Claims, 13 Drawing Sheets

(56) References Cited

U.S. PATENT DOCUMENTS

| | | | | |
|---|---|---|---|---|
| 10,855,764 B2* | 12/2020 | Ueda | ................. | H04L 67/12 |
| 2020/0037439 A1* | 1/2020 | Kim | ................. | H05K 1/115 |
| 2020/0397306 A1* | 12/2020 | Frank | ................. | G01J 5/10 |
| 2022/0207845 A1* | 6/2022 | Pelissier | ............ | G06T 7/0012 |

* cited by examiner

METHOD, APPARATUS, AND COMPUTER READABLE MEDIUM FOR SENSOR-BASED APPLICATION DEPLOYMENT

RELATED APPLICATION DATA

This application claims priority to U.S. Provisional Application No. 63/139,041 filed Jan. 19, 2021, the disclosure of which is hereby incorporated by reference in its entirety.

BACKGROUND

Artificial intelligence (AI) applications are built upon machine learning, which relies on training data in order to further refine recommendations and predictive analytics. Training data is real-world data that is provided as input to the machine learning algorithms in order to verify existing result sets, refine parameters and clustering metrics, and to further improve performance of the AI application.

In the context of AI algorithms directed to improvements or predictions based on real-world parameters, much of the training data is gathered from sensors deployed at a local deployment site.

Unfortunately, AI and machine learning techniques require large amounts of computing resources, such as processing power. Existing AI and machine learning apps run only on local computing devices, such as smart phones and local desktops, which lack the processing power to effectively implement AI and machine learning.

Additionally, existing AI or machine learning applications that utilizes sensor based data are currently limited to a single "sandbox." These applications are typically designed for a single purpose and lack any extensible framework for expanding the capabilities of deployed sensors for other purposes.

Furthermore, users of machine learning and AI applications are limited to a single communication channel (i.e., the one implemented by the specific application) when transmitting alerts or other notifications.

Accordingly, improvements are needed in systems for sensor-based application deployment, particularly in the area of artificial intelligence and machine learning applications.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate also comprise a portion of the invention. However, because such elements do not facilitate a better understanding of the invention, a description of such elements is not provided herein.

Applicant has discovered a method, apparatus, and computer-readable medium for deployment of sensor-based data analysis applications that resolves existing problems in the field. In particular, the disclosed systems and methods provide an extensible framework for deployment of sensor-based data analysis applications. This framework allows for development of different analytics applications that utilize deployed sensors, as well as integration with multiple communication channels for transmission of alerts and notifications. Additionally, the disclosed systems and methods utilize a local application server deployed at a local deployment site that includes specialized hardware and software to meet the demands of artificial intelligence and machine learning applications.

Figure 1:
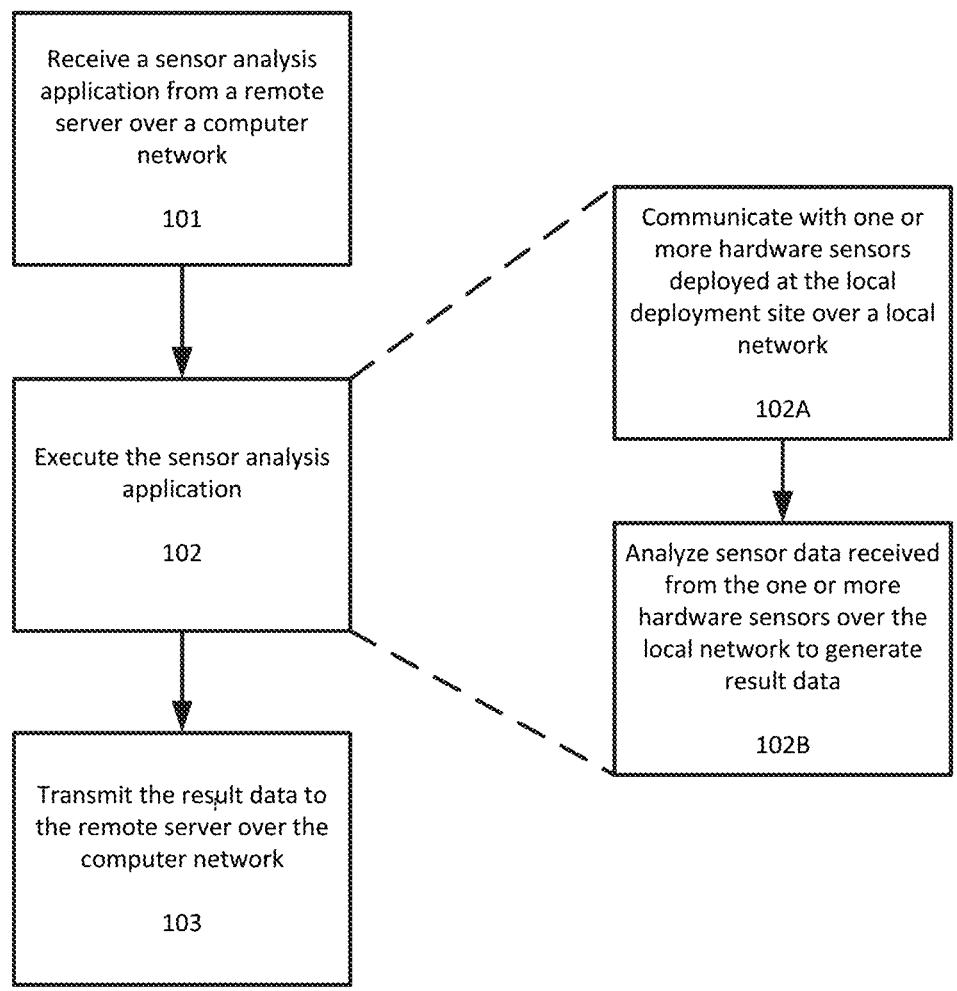
FIG. 1 illustrates a flowchart for sensor-based application deployment according to an exemplary embodiment.

FIG. 1 illustrates a flowchart for sensor-based application deployment according to an exemplary embodiment. The steps shown in FIG. 1 are performed by a local application server deployed at a local deployment site, such as a building, a house, or some particular geographic location.

At step 101 a sensor analysis application is received by the local application server from a remote server over a computer network. The computer network can be any type of communication network, but typically will be a wide area network (WAN) such as the internet. The remote server is a backend server and will typically be located at a remote geographic location from the local deployment site. As discussed in greater detail with respect to FIGS. 2-3, the remote server hosts an array of sensor-data analysis applications and is responsible for coordinating which applications are provided to local application servers and coordinating the transmission of alerts and notifications over communications channels.

The sensor analysis application can be received in response to a request from a user or from the local application server to the remote server. For example, the step of receiving a sensor analysis application from a remote server over a computer network can include receiving, by the local application server, a request for the sensor analysis application from a user over a web interface. The web interface can be accessed by a computing device with a browser and a connection to the internet. The user can transmit the request directly to the remote server or to the local application server (which can then communicate the request to the remote server).

When the user request is transmitted to the local application server, the step of receiving a sensor analysis application from a remote server over a computer network can additionally include transmitting, by the local application server, an application download request to the remote server over a computer network and receiving, by the local application server, the sensor analysis application from the remote server in response to the application download request.

At step 102 the sensor analysis application is executed by the local application server. The step of executing the sensor analysis applications includes sub-steps 102A and 102B.

At step 102A, the local application server communicates with one or more hardware sensors deployed at the local deployment site over a local network. The hardware sensors can be any type of sensor, such as a camera, video camera, a thermometer, a motion sensor, a noise sensor, a water level sensor, a pressure sensor, or any type of optical, mechanical, or electromagnetic based sensor. The hardware sensors will also include some software components in order to enable communication with the local application server, storage of data, and adjustment of configuration parameters or settings.

The local area network can be any type of communication network that is limited to a particular set of devices and/or geographic area. For example, the local area network network could be a local wireless or wired network. The local area network could also be a Bluetooth based network in which the sensors are within communication range of the local application server.

The step of communicating with the one or more hardware sensors can include transmitting one or more configuration parameters to the one or more hardware sensors over the local network. The one or more hardware sensors can be configured to update an internal configuration based on the received one or more configuration parameters. For example, configuration parameters can be sent to a sensor that instructs the sensor on when to collect data, how to organize the collected data, and when to transmit the collected data to the local application server. The configuration parameters themselves can be received by the local application server from a user over a web interface. Alternatively, the configuration parameters can be determined by the local application server based on the sensor analysis application.

The step of communicating with the one or more hardware sensors can also transmitting a request for the sensor data to the one or more hardware sensors over the local network and receiving sensor data from the one or more hardware sensors over the local network in response to the request. Alternatively, the step of communicating with the hardware sensors can include simply receiving the sensor data from the sensors (such as via push notifications) without explicitly requesting the sensor data.

At step 102B, the sensor data received from the one or more hardware sensors over the local network is analyzed to generate result data. This analysis can include, for example, machine learning or artificial intelligence techniques to perform data clustering, revise training data, adjust predictive models, etc. The result data can include, for example, an output of the machine learning or artificial intelligence techniques or an alert or notification based upon the analysis.

As discussed earlier, the local application server includes specialized hardware and software for performing analysis of the sensor data. When the sensor analysis application utilizes resource intensive processing (such as for AI and machine learning), the step of analyzing sensor data received from the one or more hardware sensors over the local network to generate result data can include processing, using one or more graphical processing units of the local server, the sensor data using one or more of a machine learning algorithm or an artificial intelligence algorithm to generate result data. The machine learning algorithm or the artificial intelligence algorithm can be an algorithm implemented by the sensor analysis application that is stored on the local application server.

Of course, the local application server can include additional specialized hardware in addition to graphical processing units (GPUs), such as specialized memory and storage systems, parallel processors and parallel architecture, and network processing units (NPUs).

At step 103 the result data is transmitted by the local application server to the remote server over the computer network. The remote server can then be configured to identify one or more communications channels based at least in part on the sensor analysis application and the received result data and transmit one or more alerts over the one or more communications channels based at least in part on the received result data. The communications channels can be for example, a particular application or mode of communication, such as Twitter™, Facebook™ messenger, text message, phone call, email, etc. The communications channels can also be determined based upon user preferences, as provided by users through the web portal. For example, a user may wish to have alerts sent via text message and Twitter™. Since the remote server is integrated with multiple different communications providers and communications channels, the remote server can then route any alerts or notifications via the appropriate channels.

Figure 2:
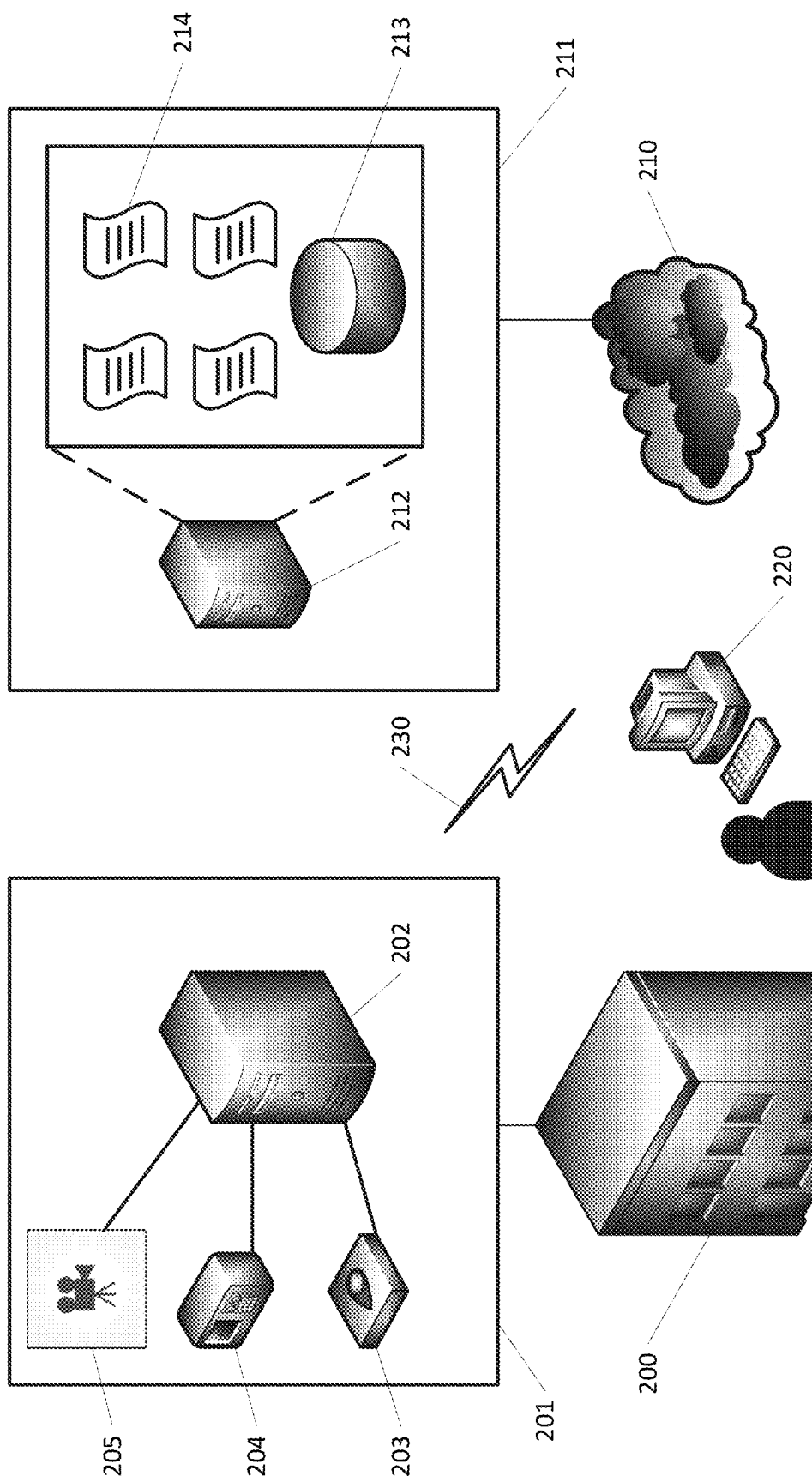
FIG. 2 illustrates a system diagram for sensor-based application deployment at a single deployment site according to an exemplary embodiment.

FIG. 2 illustrates a system diagram of the system for sensor-based application deployment with a single deployment site according to an exemplary embodiment. The system includes local hardware and software environment 201 located at a local deployment site 200 and remote hardware and software environment 211 located a remote site 210. The system can also include a user terminal or portal 220 which is shown separate from the remote site 210 and local site 200 but can be local or remote. The local deployment site 200, the remote site 210 and the user terminal 220 are connected by a wide area network 230, such as the interne.

The local hardware and software environment 201 includes the local application server 202 as well as one or more sensors, such as sensors 203, 204, and 205. The sensors 203-205 communicate with the local application server 202 over a local area network, as discussed above.

The remote hardware and software environment 211 includes remote server 212. Remote server 212 can itself store multiple sensor-based analysis applications, such as application 214, and can also include a database 213 to store configuration settings, notification settings, or any other information required for implementation of the system.

The remote server 212 can be hosted in the cloud, a remote site, or can optionally be co-located with local application server 202 at the local site 200. In the latter scenario, the "remote" server would not be remote and would function as a backend server rather than as a remote server.

The remote server 212 can be used to configure applications and settings on the local application server 202. For example, the remote server 212 can tell applications located on the local application server 202 what sensors they can use and what code to run on the sensors. All communication is done though the local application server to the sensors and not the remote server to sensors. The remote hardware and software environment can optionally include addition components such as a separate database server, rather than a database 213 integrated into the remote server 212.

Figure 3:
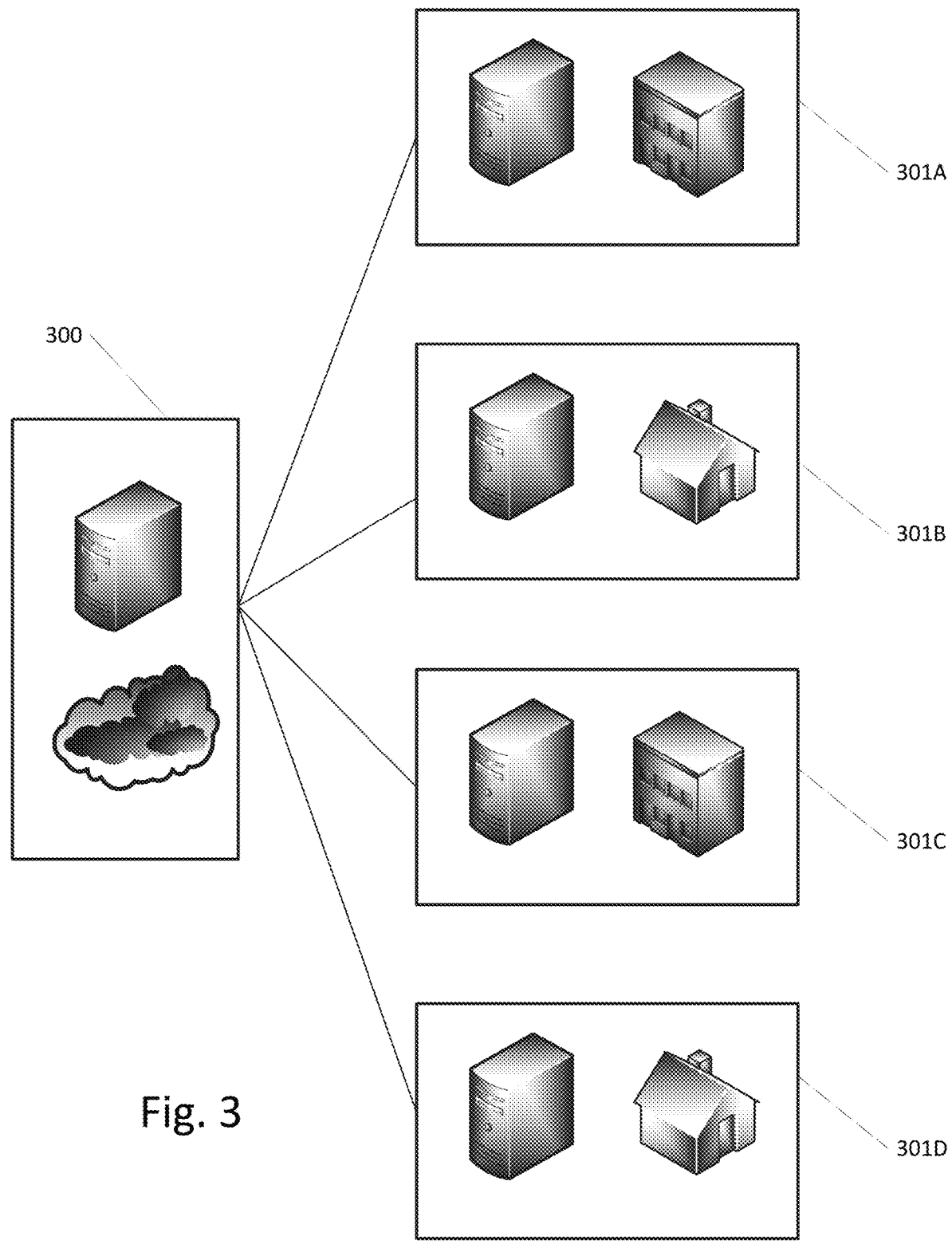
FIG. 3 illustrates a system diagram for sensor-based application deployment at multiple deployment sites according to an exemplary embodiment.

The remote server is responsible for coordinating deployment of sensor-based applications across multiple deployment sites, not just a single deployment site. FIG. 3 illustrates a system diagram for sensor-based application deployment at multiple deployment sites according to an exemplary embodiment. As shown in FIG. 3, a single remote server, located in the cloud 300, communicates and coordinates deployment of sensor-based applications across multiple local deployment sites, 301A-301D, each having their own local application server and local hardware and software environment.

FIGS. 2-3 illustrate various computing devices, hardware, and software, such as specialized servers, sensors, and other components. These computing devices include specialized hardware that is used to execute specialized software routines that implement the system for sensor-based application deployment. The computing devices and sensors can include processor(s) and memories operatively coupled to the processors and having instructions stored thereon that, when executed by the processors, cause the processors to perform the software routines. The software can be embodied on non-transitory computer-readable media, such as a disk, flash memory, or a hard drive.

Although not shown, the computing devices additionally include communications interfaces to communicate over local and wide area networks, such as wireless networks, communication cables, Bluetooth, etc.

The system can also include standard development kits (SDKs) provided to developers to allow developers to write applications that access and connect to sensors and that communicate alerts to the remote server for distribution across multiple distribution channels. The resulting sensor-based applications will utilize specialized application programming interfaces (APIs) to coordinate communication between sensors and the local application server and the local application server and the remote server.

As discussed earlier, a user can utilize a web-based or app-based portal in order to access the system for deployment of sensor-based applications. This interface allows a user to communicate directly with the remote server (or optionally, with the local server), in order select applications for download onto their local application server, configure applications on their local application server, configure sensors or sensor settings, configure and customize alerts and notifications, and perform other customization functions.

Figure 4A:
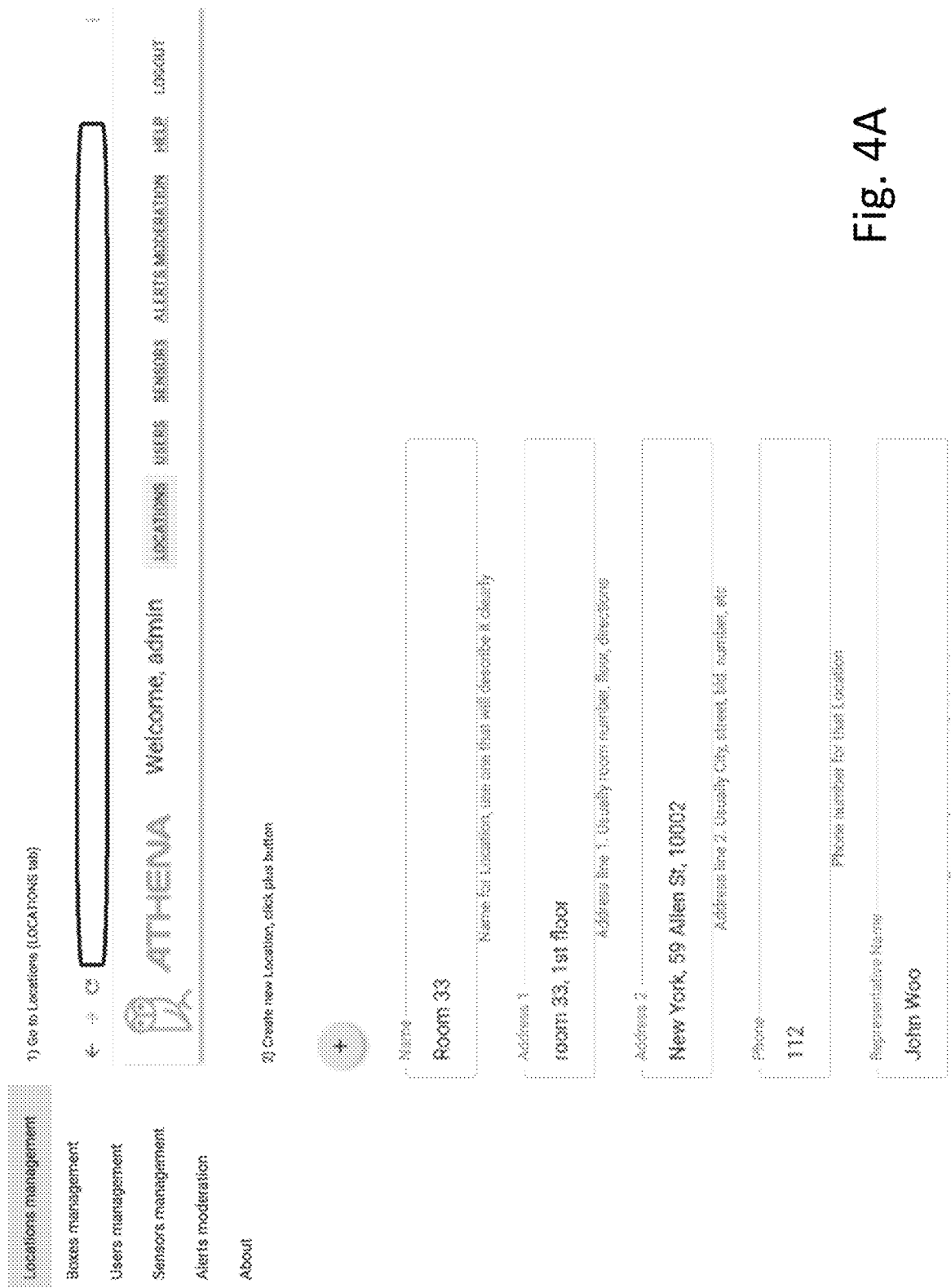
FIGS. 4A-4E illustrate a web-based interface for accessing the system for sensor-based application deployment.
Figure 4B:
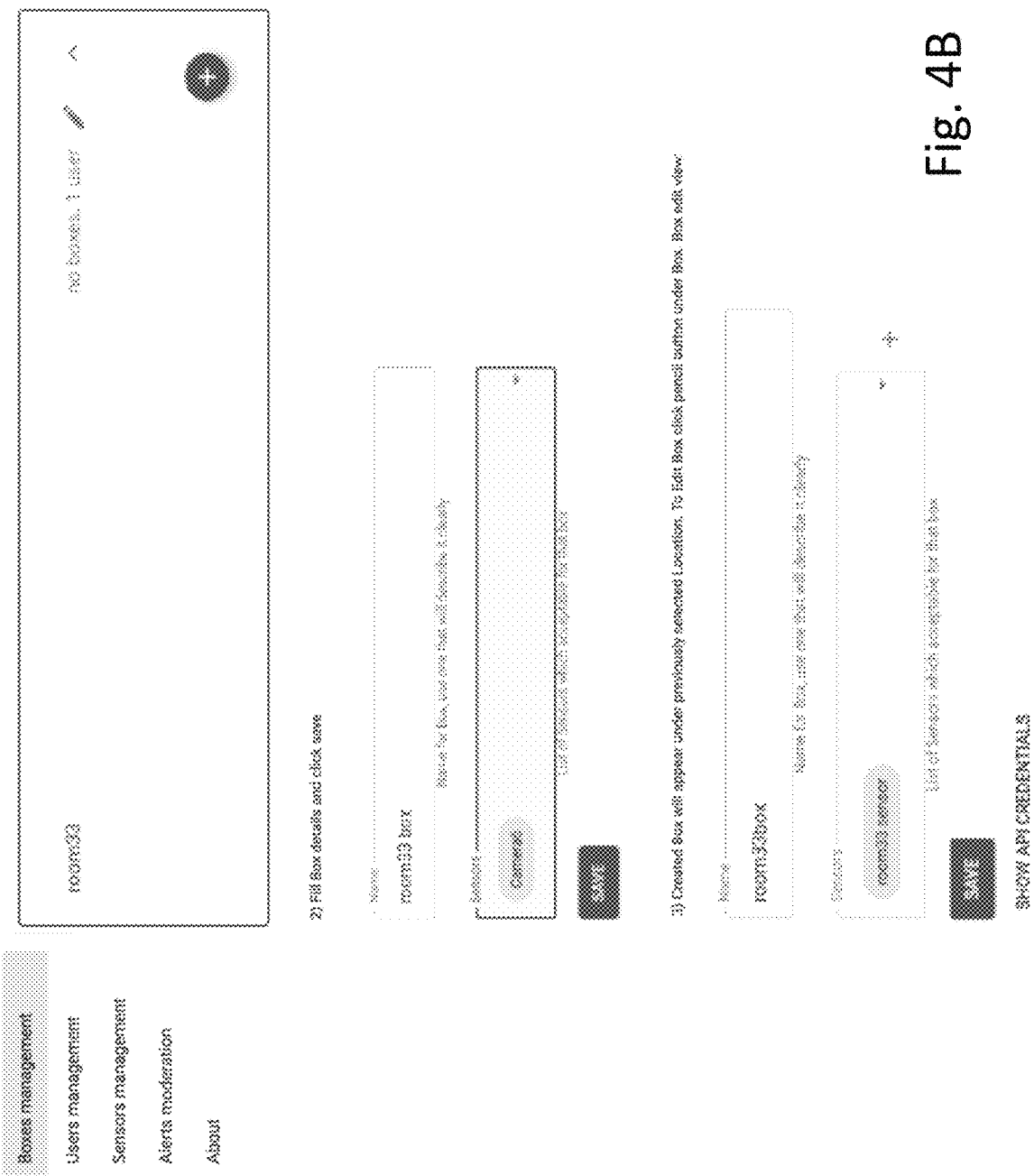
Figure 4C:
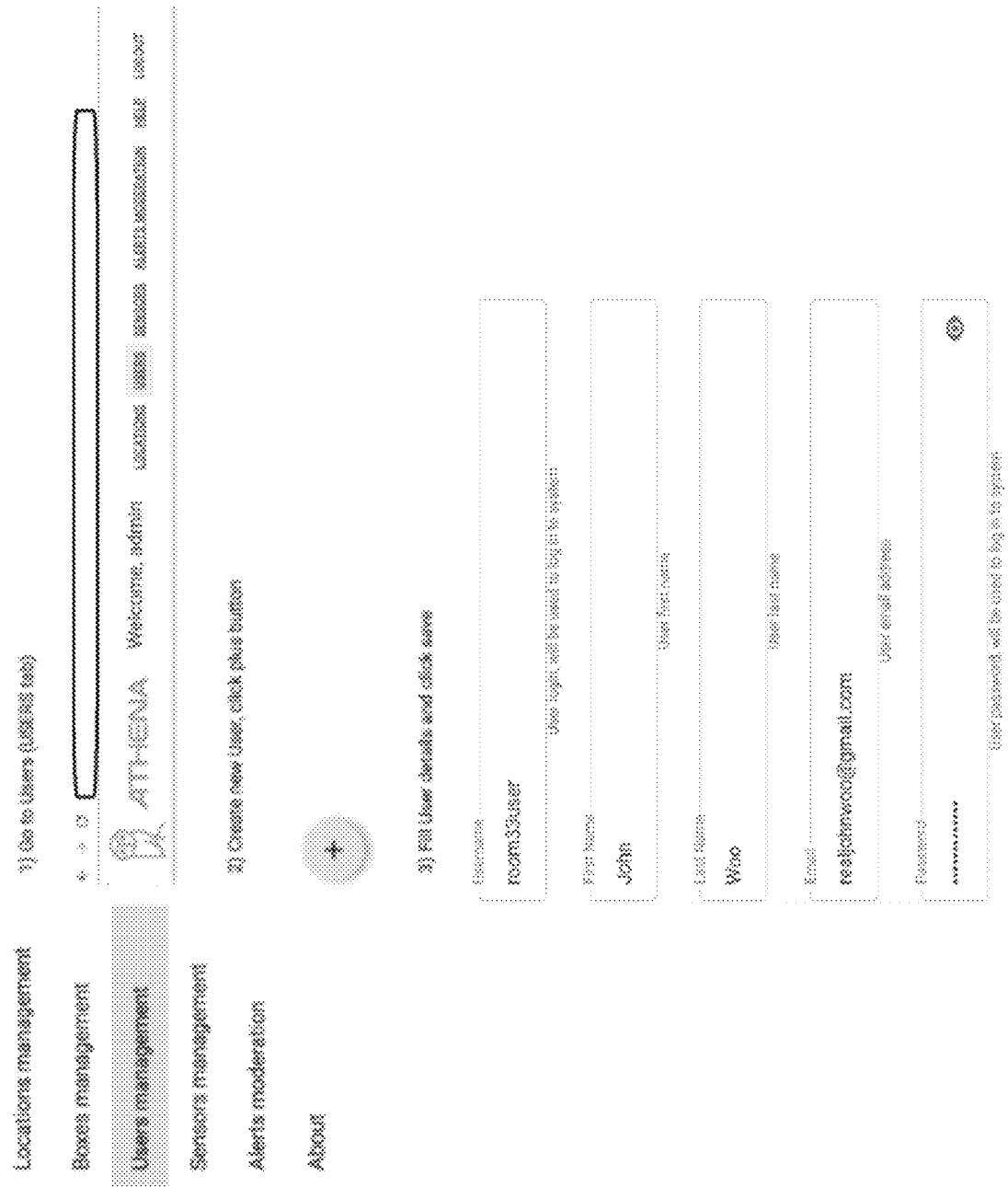
Figure 4D:
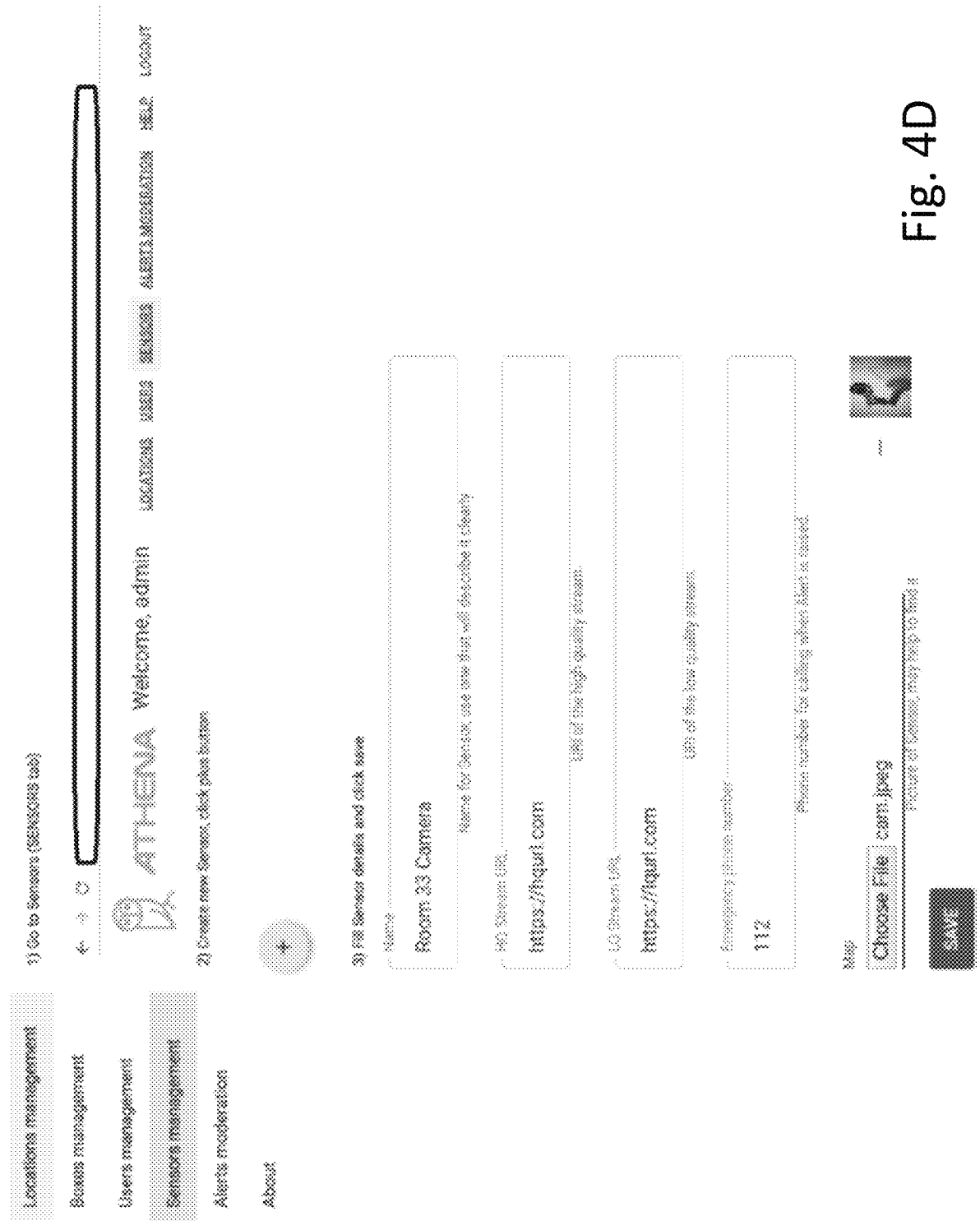
Figure 4E:
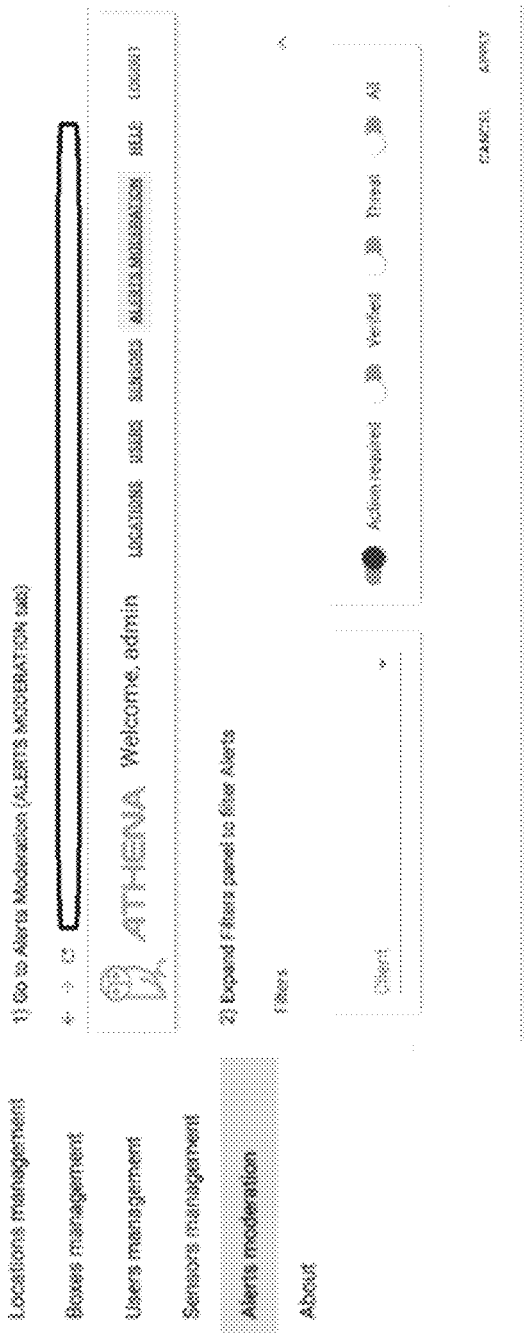

FIGS. 4A-4E illustrate a web-based interface for accessing the system for sensor-based application deployment. FIG. 4A illustrates a location management interface where a user provides and configures location details. FIG. 4B illustrates a "boxes" management interface where a user provides and configures details pertaining to their location application server (referred to as a "box"). FIG. 4C illustrates a user management interface where a user provides and configures details regarding authorized users. FIG. 4D illustrates a sensor management interface where a user provides and configures sensor details. FIG. 4E illustrates an alerts management interface where a user provides and configures alert details.

Figure 5:
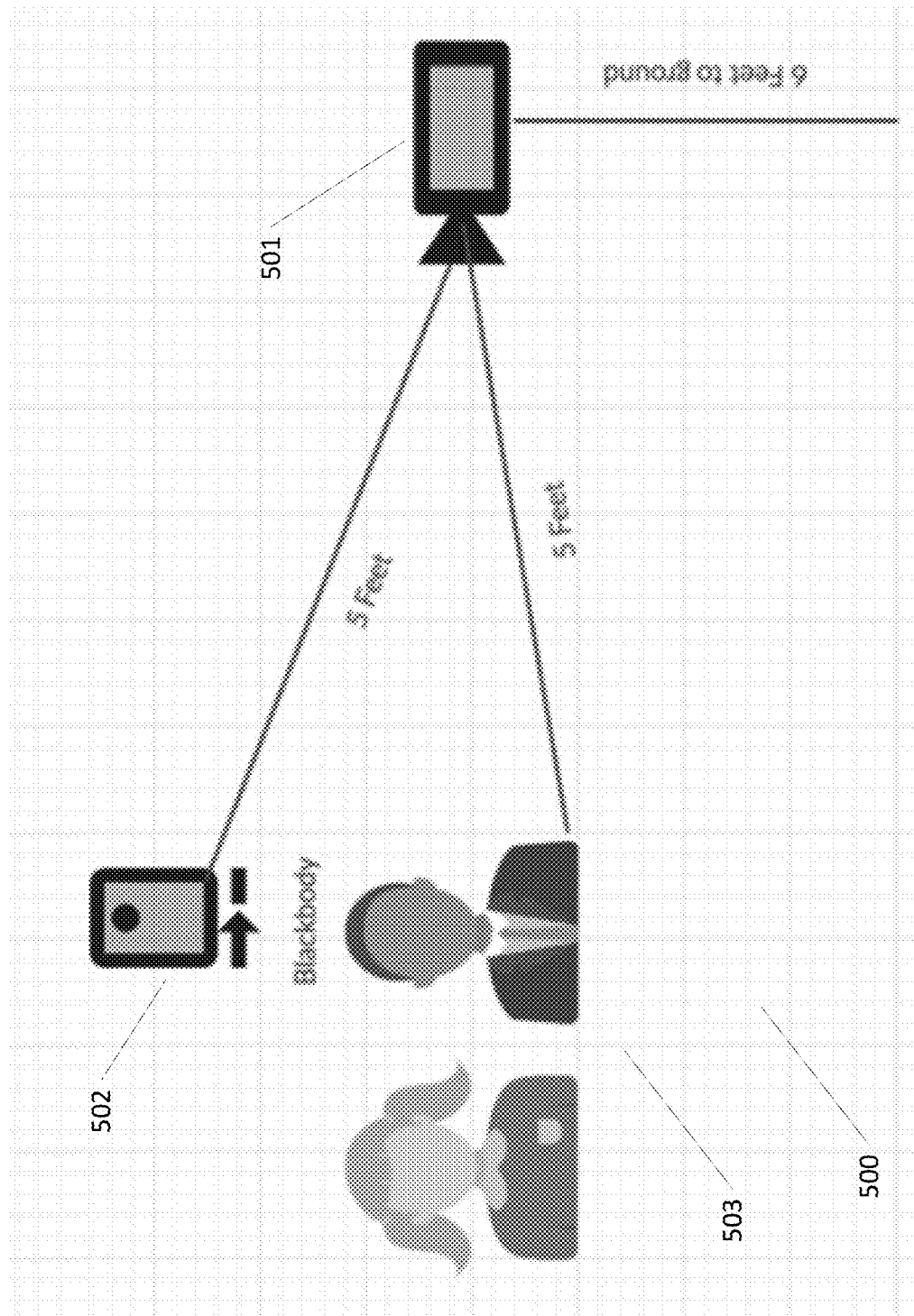
FIG. 5 illustrates the components used in a fever-detection application that incorporates the above-described systems and methods according to an exemplary embodiment.

FIG. 5 illustrates the components used in a fever-detection application that incorporates the above-described systems and methods according to an exemplary embodiment. Fever detection application is configured to utilize available sensors to identify any persons that may have a fever or a temperature above a normal range and to alert the appropriate users at the local or remote sites. This type of fever detection can be used during pandemics or outbreaks of any infection that results in fevers or high temperatures in those infected and can serve both as an early warning/alert system (i.e., residences and offices) and also as a system to aid governments/hospitals/healthcare administrators when enforcing quarantine or lockdown among a subset of a population or shifting persons into or out of quarantine.

As shown in FIG. 5, the fever detection system 500 utilizes one or more thermal imaging cameras 501 that capture light in the infrared spectrum and thereby provide temperature information about the surfaces captured. The fever detection system 500 can also optionally utilize a black body device 502 that is a device configured to maintain a constant or near constant temperature that is known to the system. The black body device 502 is used to provide a baseline temperature measurement that is captured by the thermal imaging camera(s) 501 and used to improve accuracy of temperature determination for other detected surfaces.

FIG. 5 also illustrates distances at which measurements are likely to be accurately captured/determined, such as five feet between the thermal camera 501 and the black body device 502 and persons being imaged 503, but these distances are shown by way of example only and other variations are possible.

Figure 6:
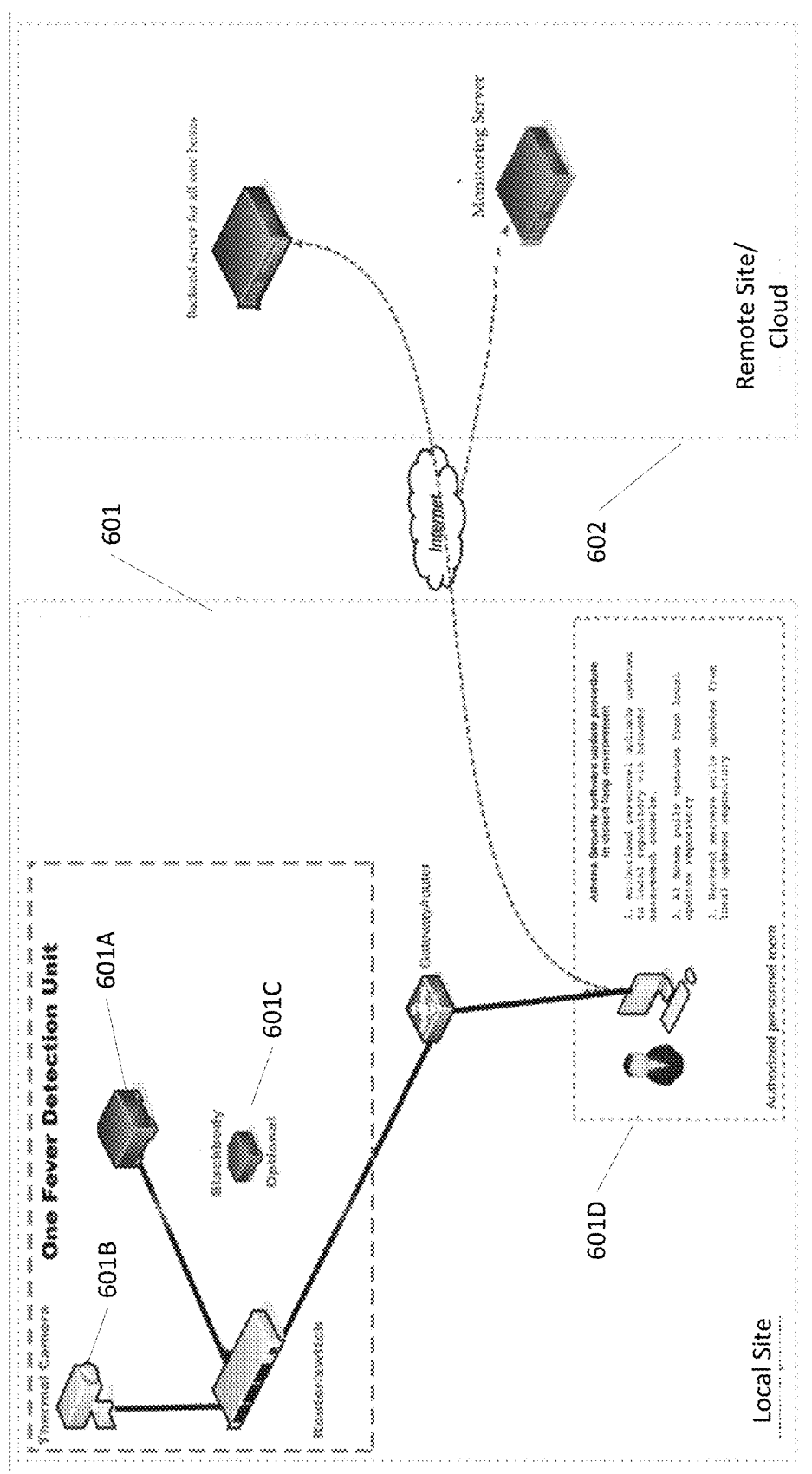
FIG. 6 illustrates a network diagram 600 of the fever detection system.

FIG. 6 illustrates a network diagram 600 of the fever detection system. The fever detection unit is implemented at a local site 601 having a local application server 601A, thermal cameras 601B, and optional black bodies (601C), all of which are accessible to a local administrator 601D via a local gateway and associated API. The system also includes a remote server site/cloud server 602 that includes the backend server (as described previously) and a monitoring server that receives temperature or fever information and issues alerts/communications as described previously.

The fever detection system utilizes a fever detection application, which can be one of the earlier-described sensor analysis applications. In this case, the one or more hardware sensors described earlier in this application can include the one or more thermal imaging cameras, and optionally one or more black body devices.

Both the thermal imaging cameras and black body devices can communicate with the local computing device executing the fever detection application at the local site. For the fever detection application, the sensor data received in step 102A of FIG. 1 can include one or more thermal images captured by at least one of the one or more thermal imaging cameras, as well as temperature or calibration information from the black body device.

Figure 7:
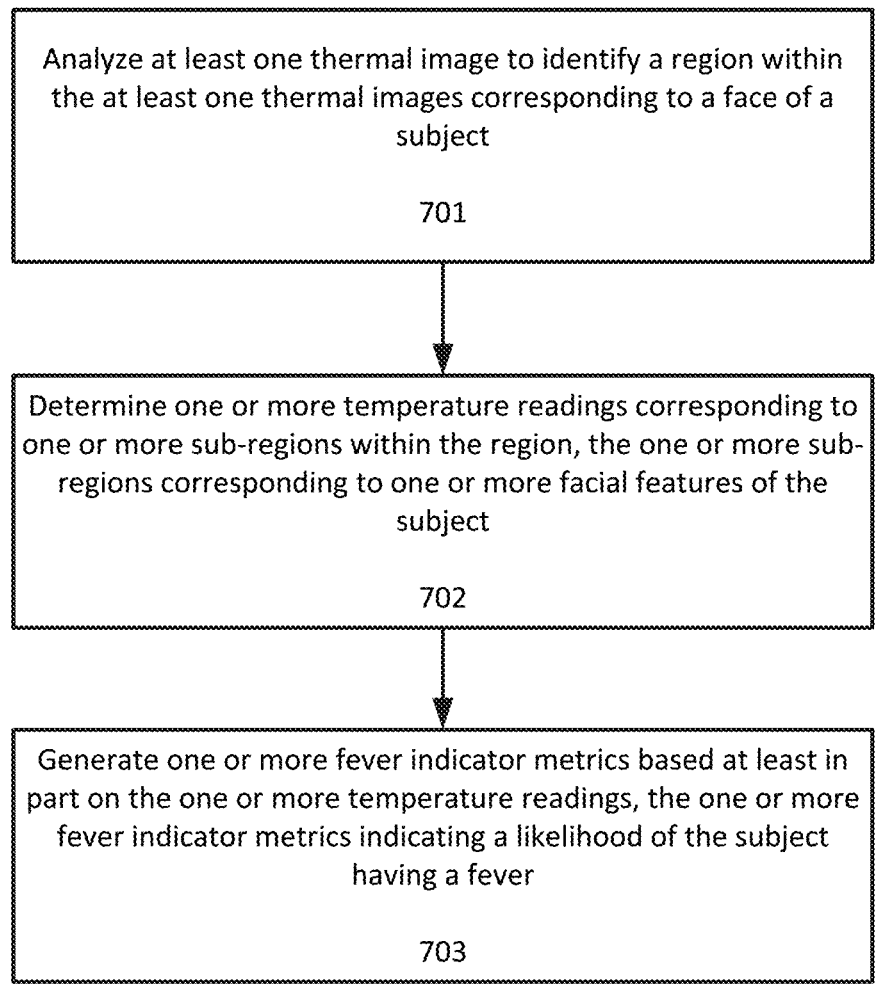
FIG. 7 illustrates a flowchart for analyzing sensor data received from the one or more hardware sensors over the local network to generate result data (step 102B of FIG. 1) when executing a fever detection application according to an exemplary embodiment.

FIG. 7 illustrates a flowchart for analyzing sensor data received from the one or more hardware sensors over the local network to generate result data (step 102B of FIG. 1) when executing a fever detection application according to an exemplary embodiment.

At step 701 at least one thermal image is analyzed to identify a region within the at least one thermal image corresponding to a face of a subject. This process can be performed using a variety of techniques. The analysis can include one or more of: facial or body recognition algorithms that analyze the thermal images and identify bodies or faces within the thermal image, concurrent analysis of images (thermal or standard) from other cameras (thermal or non-thermal), analysis of a sequence of images to detect motion, temperature signature analysis to detect the signature of a human body, image segmentation to focus in on a head or face of a user based on human anatomy and known proportions, or many other techniques.

At step 702 one or more temperature readings corresponding to one or more sub-regions within the region are determined, the one or more sub-regions corresponding to one or more facial features of the subject. The facial features can include one or more of: an eye of the subject, a forehead of the subject, an inner canthus of the eye of the subject, an inner ear of the subject, a mouth of the subject, or an area under a tongue of the subject, or any other facial features that provide temperature information that can be utilized to assess fever or high temperature.

Figure 8:
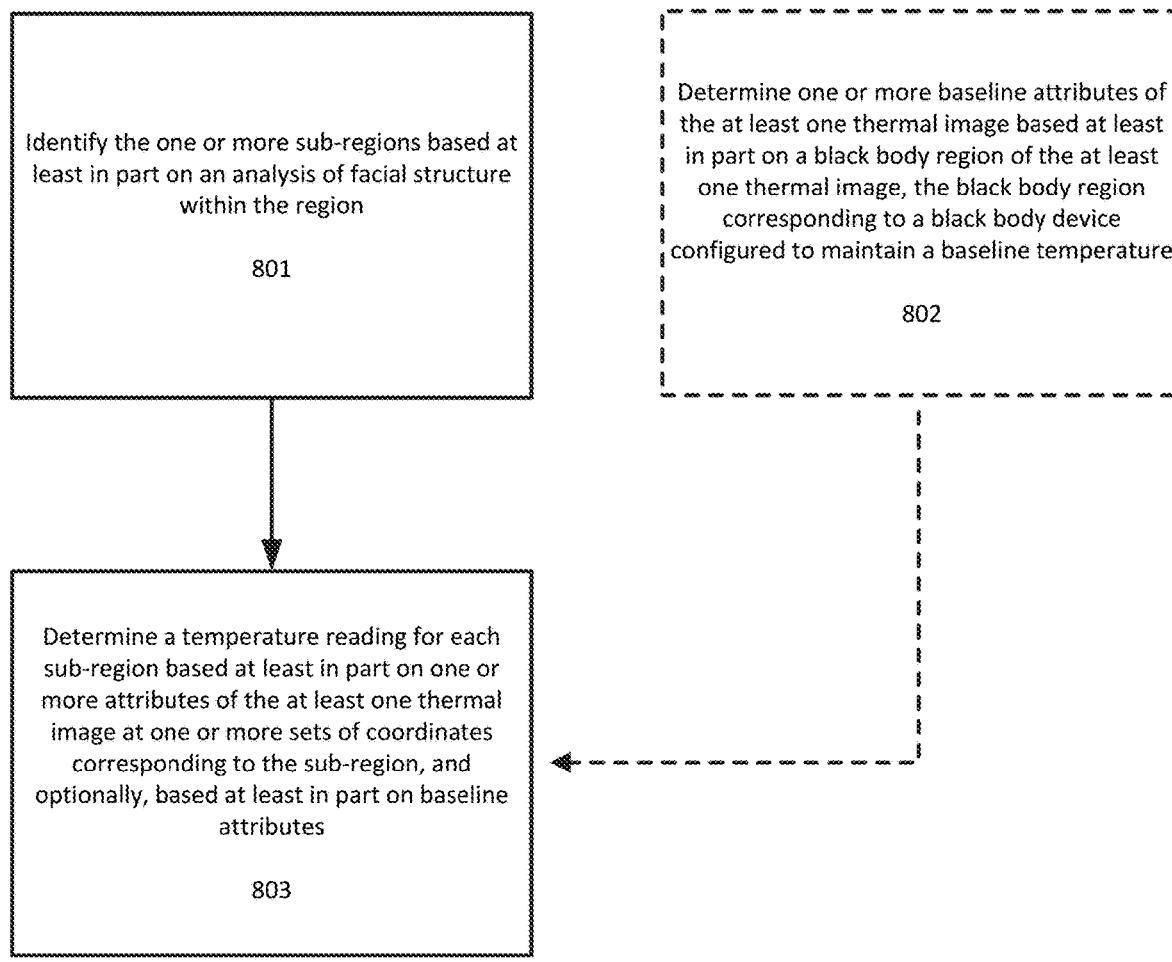
FIG. 8 illustrates a flowchart for determining one or more temperature readings corresponding to one or more sub-regions according to an exemplary embodiment.

FIG. 8 illustrates a flowchart for determining one or more temperature readings corresponding to one or more sub-regions according to an exemplary embodiment. At step 801 the one or more sub-regions are identified based at least in part on an analysis of facial structure within the region. For example, if the system is configured to analyze temperatures on a subject's eye or a subject's forehead, then image analysis algorithms can be used to analyze the region and identify the sub-regions most likely to correspond to the subject's eye or a subject's forehead.

Image analysis algorithms can also look at features in conventional images captured by the thermal camera and/or other cameras from a similar or identical vantage point at approximately the same time to aid in this analysis. Additionally, image analysis algorithms can perform thermal signature analysis to identify facial features and corresponding sub-regions, i.e., by correlating gradients in temperature to known patterns of temperature distribution in human faces. Many techniques can be utilized to detect facial features and the corresponding sub-regions within the thermal image, including techniques aided by training data, predictive models, and machine learning, and these examples are not intended to be limiting.

At step 802 a temperature reading for each sub-region is determined based at least in part on one or more attributes of the at least one thermal image at one or more sets of coordinates corresponding to the sub-region. The temperature reading can be based on multiple measurements within a sub-region. For example, if the sub-region corresponds to a forehead, then the thermal image attributes can be measured at five distinct sets of coordinates, all within the forehead sub-region, and aggregated to provide a representative reading for the sub-region and facial feature.

The attributes of the thermal image that are used to make the determination can include color representation, pigment, frequency, wavelength, surface temperature or temperature gradient, or any other information within the thermal image itself or included as metadata with the image that can be used to determine temperature at a particular set of coordinates within the thermal image.

As discussed earlier, the fever detection system can optionally utilize black body devices that are configured to maintain a baseline or constant (or near-constant) temperature. When a black body device is used, then at optional step 802, one or more baseline attributes of the at least one thermal image are determined based at least in part on a black body region of the at least one thermal image, the black body region corresponding to a black body device configured to maintain a baseline temperature.

The black body region itself can be identified using any of the image processing, feature extraction, and feature recognition processes described earlier. For example a thermal signature derived from the black body can be stored in memory and then used to identify the black body in each thermal image.

The black body device can be one of the connected hardware sensors in the local site and can provide diagnostic and other system information periodically or continuously to aid in the determination of baseline attributes. For example, if the black body device expends a large amount of energy maintain the same temperature, then the energy consumption information can be used to determine ambient temperature fluctuations that should be factored in when determining the temperature of a sub-region of a face.

If optional step 802 is performed, then at step 803 a temperature reading for each sub-region is determined based at least in part on the one or more attributes of the at least one thermal image at the one or more sets of coordinates corresponding to the sub-region and the one or more baseline attributes determined from the black body region. The baseline attributes provide information that can be used to calibrate the system, filter out noise or ambient temperature fluctuations, and provide overall higher accuracy to the temperature readings.

Returning to FIG. 7, at step 703 one or more fever indicator metrics are generated/determined based at least in part on the one or more temperature readings. The one or more fever indicator metrics indicating a likelihood of the subject having a fever and can include temperature values, probability scores, confidence values, or any other variable or metric that indicates a likelihood of a subject having a fever.

The fever indicator metrics can be generated based on a predictive model or as a result of an artificial intelligence algorithm running on the local application server or as part of the fever detection application. For example, the predictive model can take facial features and associated temperature readings as input and provide an output indicating the likelihood of the subject having a fever. The model itself can be trained prior to application deployment using test subjects and/or continuously trained based on feedback from a local administrator (e.g., indicating when the fever detection application was correct or incorrect).

The fever indicator metrics form the result data in step 103 of FIG. 1 and are transmitted to the remote server over the computer network. As discussed earlier, depending on the results, one or more alerts or communications can be transmitted from the remote server or monitoring server. For example, a user can be alerted when someone with a high fever has entered their home or business or a certain area of the local site.

Figure 9:
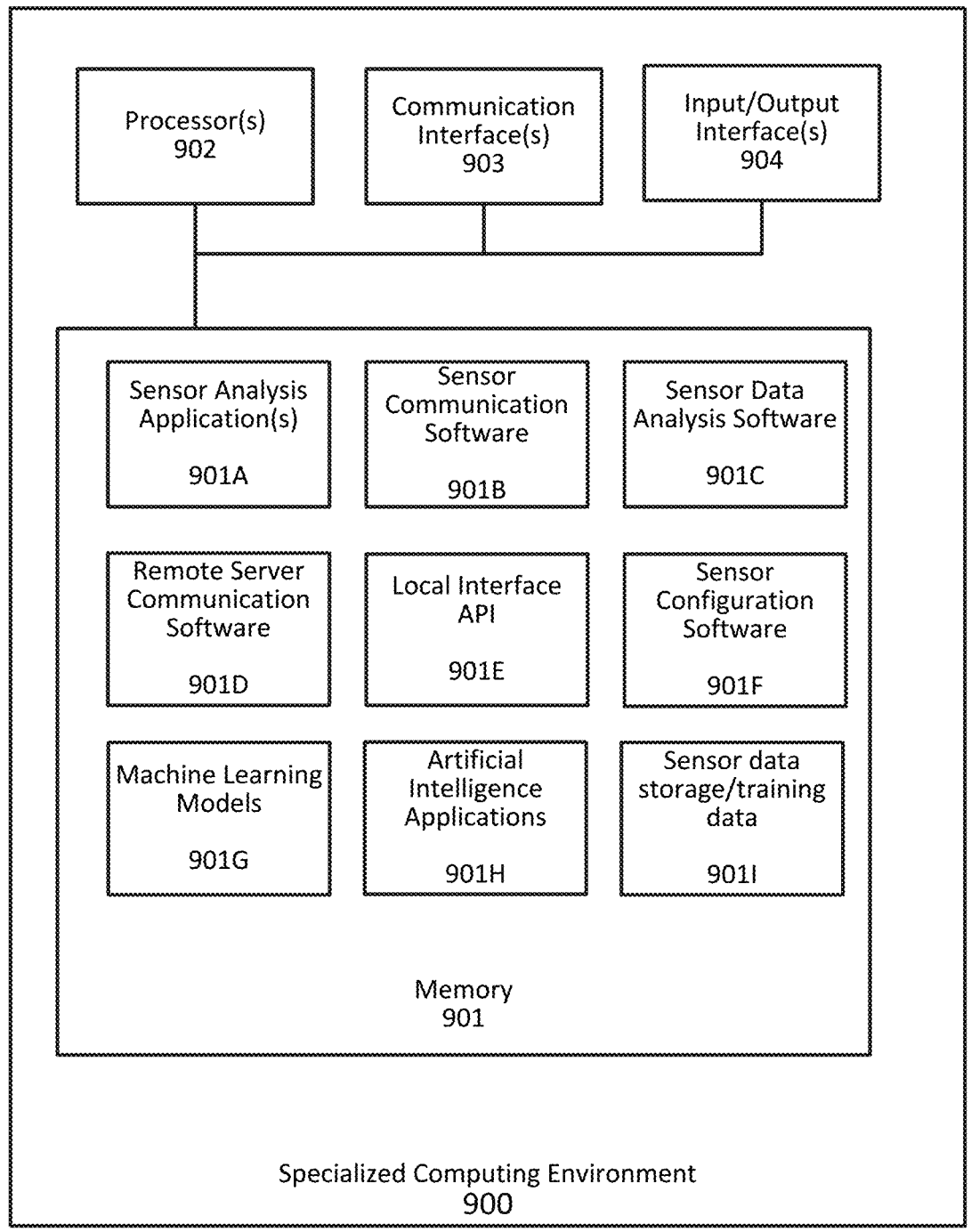
FIG. 9 illustrates the components of the specialized computing environment 900 configured to perform the processes described herein, such as the local application server.

FIG. 9 illustrates the components of the specialized computing environment 900 configured to perform the processes described herein., such as the local application server. Specialized computing environment 900 is a computing device that includes a memory 901 that is a non-transitory computer-readable medium and can be volatile memory (e.g., registers, cache), non-volatile memory (e.g., flash memory, etc.), or some combination of the two.

As shown in FIG. 9, memory 901 can include sensor analysis applications 901A (including fever detection application), sensor communication software 901B, sensor data analysis software 901C, remote server communication software 901D, local interface API 901E, sensor configuration software 901F, machine learning models 901G and artificial intelligence applications 901H (both of which can also be part of sensor analysis applications 901A), and sensor data storage/training data 901I. Each of the software components in memory 1501 store specialized instructions and data structures configured to perform the corresponding functionality and techniques described herein.

All of the software stored within memory 901 can be stored as a computer-readable instructions, that when executed by one or more processors 902, cause the processors to perform the functionality described with respect to FIGS. 1-8.

Processor(s) 902 execute computer-executable instructions and can be a real or virtual processors. In a multi-processing system, multiple processors or multicore processors can be used to execute computer-executable instructions to increase processing power and/or to execute certain software in parallel.

Specialized computing environment 900 additionally includes a communication interface 903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 900 further includes input and output interfaces 904 that allow users (such as system administrators) to provide input to the system to set parameters, to edit data stored in memory 901, or to perform other administrative functions.

An interconnection mechanism (shown as a solid line in FIG. 9), such as a bus, controller, or network interconnects the components of the specialized computing environment 900.

Input and output interfaces 904 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 900.

Specialized computing environment 900 can additionally utilize a removable or non-removable storage, such as magnetic disks, magnetic tapes or cassettes, USB drives, or any other medium which can be used to store information and which can be accessed within the specialized computing environment 1500.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Elements of the described embodiment shown in software may be implemented in hardware and vice versa.

It will be appreciated by those skilled in the art that changes could be made to the embodiments described above without departing from the broad inventive concept thereof. For example, the steps or order of operation of one of the above-described methods could be rearranged or occur in a different series, as understood by those skilled in the art. It is understood, therefore, that this disclosure is not limited to the particular embodiments disclosed, but it is intended to cover modifications within the spirit and scope of the present disclosure as defined by the appended claims.

The invention claimed is:

1. A method executed by a local application server at a local deployment site for sensor-based application deployment, the method comprising:
   receiving, by the local application server, a sensor analysis application from a remote server over a computer network, the sensor analysis application being configured to interface with the one or more hardware sensors at the local deployment site and generate result data based at least in part on data captured by the one or more hardware sensors;
   executing, by the local application server, the sensor analysis application, wherein executing the sensor analysis application comprises:
      transmitting one or more configuration parameters to the one or more hardware sensors over a local network, wherein the one or more hardware sensors are configured to update an internal configuration based at least in part on the one or more configuration parameters;
      receiving sensor data from the one or more hardware sensors over the local network; and
      analyzing the sensor data received from the one or more hardware sensors over the local network to generate result data;
   transmitting, by the local application server, the result data to the remote server over the computer network, wherein the remote server is configured to identify one or more communications channels based at least in part on the sensor analysis application and transmit one or more alerts over the one or more communications channels based at least in part on the received result data.

2. The method of claim 1, wherein receiving, by the local application server, a sensor analysis application from a remote server over a computer network comprises:
   receiving, by the local application server, a request from a user over a web interface for the sensor analysis application;
   transmitting, by the local application server, an application download request to the remote server over a computer network;
   receiving, by the local application server, the sensor analysis application from the remote server in response to the application download request.

3. The method of claim 1, wherein the one or more configuration parameters are either received by the local application server from a user over a web interface or determined by the local application server based on the sensor analysis application.

4. The method of claim 1, wherein the sensor data is received from the one or more hardware sensors over the local network in response to a request transmitted to the one or more hardware sensors over the local network.

5. The method of claim 1, wherein analyzing the sensor data received from the one or more hardware sensors over the local network to generate result data comprises:
   processing, using one or more graphical processing units of the local server, the sensor data using one or more of a machine learning algorithm or an artificial intelligence algorithm to generate result data.

6. The method of claim 5, wherein the machine learning algorithm or the artificial intelligence algorithm is implemented by the sensor analysis application.

7. The method of claim 1, wherein the sensor analysis application comprises a fever detection application and wherein the one or more hardware sensors comprise one or more thermal imaging cameras.

8. The method of claim 7, wherein the sensor data comprises one or more thermal images captured by at least one of the one or more thermal imaging cameras.

9. The method of claim 8, wherein analyzing sensor data received from the one or more hardware sensors over the local network to generate result data comprises:
   analyzing at least one thermal image to identify a region within the at least one thermal image corresponding to a face of a subject;
   determining one or more temperature readings corresponding to one or more sub-regions within the region, the one or more sub-regions corresponding to one or more facial features of the subject;
   generating one or more fever indicator metrics based at least in part on the one or more temperature readings, the one or more fever indicator metrics indicating a likelihood of the subject having a fever.

10. The method of claim 9, wherein determining one or more temperature readings corresponding to one or more sub-regions within the region comprises:
    identify the one or more sub-regions based at least in part on an analysis of facial structure within the region;
    determining a temperature reading for each sub-region based at least in part on one or more attributes of the at least one thermal image at one or more sets of coordinates corresponding to the sub-region.

11. The method of claim 10, wherein determining a temperature reading for each sub-region based at least in part on one or more attributes of the at least one thermal image at one or more sets of coordinates corresponding to the sub-region comprises:
    determining one or more baseline attributes of the at least one thermal image based at least in part on a black body region of the at least one thermal image, the black body region corresponding to a black body device configured to maintain a baseline temperature; and
    determining a temperature reading for each sub-region based at least in part on the one or more attributes of the at least one thermal image at the one or more sets of coordinates corresponding to the sub-region and the one or more baseline attributes.

12. The method of claim 9, wherein the one or more facial features of the subject comprises one or more of: an eye of the subject, a forehead of the subject, an inner canthus of the eye of the subject, an inner ear of the subject, a mouth of the subject, or an area under a tongue of the subject.

13. A local application server located at a local deployment site for sensor-based application deployment, the local application server comprising:
    one or more processors; and
    one or more memories operatively coupled to at least one of the one or more processors and having instructions stored thereon that are configured to cause at least one of the one or more processors to:
       receive a sensor analysis application from a remote server over a computer network, the sensor analysis application being configured to interface with the one or more hardware sensors deployed at the local deployment site and generate result data based at least in part on data captured by the one or more hardware sensors; and
       execute the sensor analysis application, wherein the instructions that are configured to cause at least one of the one or more processors to execute the sensor analysis application are further configured to cause at least one of the one or more processors to:
          transmitting one or more configuration parameters to the one or more hardware sensors over a local network, wherein the one or more hardware sensors are configured to update an internal configuration based at least in part on the one or more configuration parameters;
          receiving sensor data from the one or more hardware sensors over the local network; and
          analyze the sensor data received from the one or more hardware sensors over the local network to generate result data; and
       transmit the result data to the remote server over the computer network, wherein the remote server is configured to identify one or more communications channels based at least in part on the sensor analysis application and transmit one or more alerts over the one or more communications channels based at least in part on the received result data.

14. The local application server of claim 13, wherein the instructions configured to cause at least one of the one or more processors to receive a sensor analysis application from a remote server over a computer network further cause at least one of the one or more processors to:
    receive a request from a user over a web interface for the sensor analysis application;
    transmit an application download request to the remote server over a computer network; and
    receive the sensor analysis application from the remote server in response to the application download request.

15. The local application server of claim 13, wherein the one or more configuration parameters are either received by the local application server from a user over a web interface or determined by the local application server based on the sensor analysis application.

16. At least one non-transitory computer-readable medium storing computer-readable instructions configured to cause a local application server located at a local deployment site to:
    receive a sensor analysis application from a remote server over a computer network;
    execute the sensor analysis application, wherein the instructions configured to cause the local application server to execute the sensor analysis application further cause the local application server to:
       transmit one or more configuration parameters to the one or more hardware sensors over a local network, wherein the one or more hardware sensors are configured to update an internal configuration based at least in part on the one or more configuration parameters;
       receiving sensor data from the one or more hardware sensors over the local network; and
       analyze the sensor data received from the one or more hardware sensors over the local network to generate result data; and
    transmit the result data to the remote server over the computer network, wherein the remote server is configured to identify one or more communications channels based at least in part on the sensor analysis application and transmit one or more alerts over the one or more communications channels based at least in part on the received result data.

17. The at least one non-transitory computer-readable medium of claim 16, wherein the instructions configured to cause the local application server to receive a sensor analysis application from a remote server over a computer network further cause the local application server to:
  receive a request from a user over a web interface for the sensor analysis application;
  transmit an application download request to the remote server over a computer network; and
  receive the sensor analysis application from the remote server in response to the application download request.

18. The at least one non-transitory computer-readable medium of claim 16, wherein the one or more configuration parameters are either received by the local application server from a user over a web interface or determined by the local application server based on the sensor analysis application.

\* \* \* \* \*